(12) United States Patent
Xing et al.

(10) Patent No.: US 7,573,851 B2
(45) Date of Patent: Aug. 11, 2009

(54) METHOD AND SYSTEM FOR SWITCHING ANTENNA AND CHANNEL ASSIGNMENTS IN BROADBAND WIRELESS NETWORKS

(75) Inventors: Guanbin Xing, Bellevue, WA (US); Manyuan Shen, Bellevue, WA (US); Hui Liu, Sammamish, WA (US)

(73) Assignee: Adaptix, Inc., Bellevue, WA (US)

( * ) Notice: Subject to any disclaimer, the term of this patent is extended or adjusted under 35 U.S.C. 154(b) by 659 days.

(21) Appl. No.: 11/007,064

(22) Filed: Dec. 7, 2004

(65) Prior Publication Data

US 2006/0120395 A1 Jun. 8, 2006

(51) Int. Cl.
*H04Q 7/00* (2006.01)
(52) U.S. Cl. .................................. 370/334; 370/332
(58) Field of Classification Search ................ 370/312, 370/208, 203, 314, 319, 320, 321, 332, 333, 370/334, 335, 337, 342, 343, 347, 310, 310.2, 370/336, 344, 329, 349, 431, 464
See application file for complete search history.

(56) References Cited

U.S. PATENT DOCUMENTS

| | | | | |
|---|---|---|---|---|
| 5,327,576 A | * | 7/1994 | Uddenfeldt et al. | 370/333 |
| 6,175,550 B1 | * | 1/2001 | van Nee | 370/206 |
| 6,281,840 B1 | * | 8/2001 | Miyoshi et al. | 342/374 |
| 6,870,808 B1 | * | 3/2005 | Liu et al. | 370/203 |
| 6,904,283 B2 | * | 6/2005 | Li et al. | 455/450 |
| 7,062,246 B2 | * | 6/2006 | Owen | 455/277.1 |
| 7,062,295 B2 | * | 6/2006 | Yoshii et al. | 455/562.1 |
| 7,072,315 B1 | * | 7/2006 | Liu et al. | 370/329 |
| 7,116,944 B2 | * | 10/2006 | Das et al. | 455/69 |
| 2002/0006120 A1 | | 1/2002 | Suzuki et al. | |
| 2002/0188723 A1 | | 12/2002 | Choi et al. | |
| 2003/0003937 A1 | | 1/2003 | Ohkubo et al. | |
| 2005/0064908 A1 | * | 3/2005 | Boariu et al. | 455/562.1 |
| 2005/0185733 A1 | * | 8/2005 | Tolli et al. | 375/285 |

OTHER PUBLICATIONS

International Search Report & Written Opinion issued for PCT/US05/44156 dated Oct. 26, 2006.

* cited by examiner

*Primary Examiner*—Brenda Pham
(74) *Attorney, Agent, or Firm*—Fulbright & Jaworski L.L.P.

(57) ABSTRACT

A method and apparatus for antenna switching, grouping, and channel assignments in wireless communication systems. The invention allows multiuser diversity to be exploited with simple antenna operations, therefore increasing the capacity and performance of wireless communications systems. Channel characteristics indicative of signal reception quality for downlink or bi-directional traffic for each channel/antenna resource combination are measured or estimated at a subscriber. Corresponding channel characteristic information is returned to the base station. Channel characteristics information may also be measured or estimated for uplink or bi-directional signals received at each of multiple receive antenna resources. The base station employs channel allocation logic to assign uplink, downlink and/or bi-directional channels for multiple subscribers based on channel characteristics measured and/or estimated for the uplink, downlink and/or bi-directional channels.

31 Claims, 9 Drawing Sheets

METHOD AND SYSTEM FOR SWITCHING ANTENNA AND CHANNEL ASSIGNMENTS IN BROADBAND WIRELESS NETWORKS

FIELD OF THE INVENTION

The present invention relates to the field of communications systems; more particularly, the present invention relates to techniques for switching channel and antenna assignments in wireless networks.

BACKGROUND OF THE INVENTION

Spatial processing with antenna arrays is one of the most used techniques in wireless communications. Among many schemes developed to date, multiple-input multiple-output (MIMO) and beamforming are often studied and have been proved to be effective in increasing the capacity and performance of a wireless network (see, e.g., Ayman F. Naguib, Vahid Tarokh, Nambirajan Seshadri, A. Robert Calderbank, "A Space-Time Coding Modem for High-Data-Rate Wireless Communications", IEEE Journal on Selected Areas in Communications, vol. 16, no. 8, October 1998 pp. 1459-1478). On the other hand, realization of MIMO or beamforming often means higher complexity and cost on the system side. In particular, MIMO operations entail complicated signal processing and decoding, while beamforming involves hardware calibrations and multi-dimensional data processing.

Over the years, orthogonal division multiple-access (OFDMA) has become the access scheme of choice for almost all broadband wireless networks (e.g., WiMAX, WiFi, and 4G cellular systems). In OFDMA, multiple subscribers are allocated to different subcarriers, in a fashion similar to frequency division multiple access (FDMA). For more information, see Sari and Karam, "Orthogonal Frequency-Division Multiple Access and its Application to CATV Networks," European Transactions on Telecommunications, Vol. 9 (6), pp. 507-516, November/December 1998 and Nogueroles, Bossert, Donder, and Zyablov, "Improved Performance of a Random OFDMA Mobile Communication System," Proceedings of IEEE VTC'98, pp. 2502-2506.

The fundamental phenomenon that makes reliable wireless transmission difficult to achieve is time-varying multipath fading. Increasing the quality or reducing the effective error rate in a multipath fading channel may be extremely difficult. For instance, consider the following comparison between a typical noise source in a non-multipath environment and multipath fading. In environments having additive white Gaussian noise (AWGN), it may require only 1- or 2-db higher signal-to-noise ratio (SNR) using typical modulation and coding schemes to reduce the effective bit error rate (BER) from $10^{-2}$ to $10^{-3}$. Achieving the same reduction in a multipath fading environment, however, may require up to 10 db improvement in SNR. The necessary improvement in SRN may not be achieved by simply providing higher transmit power or additional bandwidth, as this is contrary to the requirements of next generation broadband wireless systems.

Multipath phenomena causes frequency-selective fading. In a multiuser fading environment, the channel gains are different for different subcarriers. Furthermore, the channels are typically uncorrelated for different subscribers. This leads to a so-called "multiuser diversity" gain that can be exploited through intelligent subcarrier allocation. In other words, it is advantageous in an OFDMA system to adaptively allocate the subcarriers to subscribers so that each subscriber enjoys a high channel gain. For more information, see Wong et al., "Multiuser OFDM with Adaptive Subcarrier, Bit and Power Allocation," IEEE J. Select. Areas Commun., Vol. 17(10), pp. 1747-1758, October 1999.

Within one cell, the subscribers can be coordinated to have different subcarriers in OFDMA. The signals for different subscribers can be made orthogonal and there is little intracell interference. However, with an aggressive frequency reuse plan, e.g., the same spectrum is used for multiple neighboring cells, the problem of intercell interference arises. It is clear that the intercell interference in an OFDMA system is also frequency selective and it is advantageous to adaptively allocate the subcarriers so as to mitigate the effect of intercell interference.

One approach to subcarrier allocation for OFDMA is a joint optimization operation, not only requiring the activity and channel knowledge of all the subscribers in all the cells, but also requiring frequent rescheduling every time an existing subscribers is dropped off the network or a new subscribers is added onto the network. This is often impractical in real wireless system, mainly due to the bandwidth cost for updating the subscriber information and the computation cost for the joint optimization.

Existing approaches for wireless traffic channel assignment are subscriber-initiated and single-subscriber (point-to-point) in nature. Since the total throughput of a multiple-access network depends on the channel fading profiles, noise-plus-interference levels, and in the case of spatially separately transceivers, the spatial channel characteristics, of all active subscribers, distributed or subscriber-based channel loading approaches are fundamentally sub-optimum. Furthermore, subscriber-initiated loading algorithms are problematic when multiple transceivers are employed as the base-station, since the signal-to-noise-plus-interference ratio (SINR) measured based on an omni-directional sounding signal does not reveal the actual quality of a particular traffic channel with spatial processing gain. In other words, a "bad" traffic channel measured at the subscriber based on the omni-directional sounding signal may very well be a "good" channel with proper spatial beamforming from the base-station. For these two reasons, innovative information exchange mechanisms and channel assignment and loading protocols that account for the (spatial) channel conditions of all accessing subscribers, as well as their QoS requirements, are highly desirable. Such "spatial-channel and QoS-aware" allocation schemes can considerably increase the spectral efficiency and hence data throughput in a given bandwidth. Thus, distributed approaches, i.e., subscriber-initiated assignment are fundamentally sub-optimum.

SUMMARY OF THE INVENTION

A method and apparatus is disclosed herein for antenna switching and channel assignments in wireless communication systems. Channel characteristics indicative of signal reception quality are obtained for each of multiple channels hosted by each antenna resource at a base station. Channels are assigned to subscribers based on the channel characteristics. base station,

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4a is a flowchart illustrating operations performed to obtain downlink or bi-directional link channel characteristics using the beacon signal scheme of FIG. 3a.

DETAILED DESCRIPTION OF THE PRESENT INVENTION

The marriage of OFDMA and spatial processing provides powerful platform for multiuser broadband communications. The present invention describes a method, apparatus, and system for easy integration of OFDMA with antenna arrays of various configurations. The method and apparatus allows multiuser diversity to be exploited with simple antenna operations, therefore increasing the capacity and performance of wireless communications systems. In one embodiment, Channel characteristics indicative of signal reception quality for downlink or bi-directional traffic for each channel (e.g., OFDMA subchannel/antenna resource combination) are measured or estimated at a subscriber. Corresponding channel characteristic information is returned to the base station. Channel characteristics information may also be measured or estimated for uplink or bi-directional signals received at each of multiple receive antenna resources. The base station employs channel allocation logic to assign uplink, downlink and/or bi-directional channels for multiple subscribers based on channel characteristics measured and/or estimated for the uplink, downlink and/or bi-directional channels.

The benefits of the present invention include simpler hardware (much less expensive than beamforming antenna arrays) and easier processing (much less complicated than MIMO), without sacrificing the overall system performance. In addition to OFDMA implementation, the general principles may be utilized in FDMA (frequency division multiple access), TDMA (time division multiple access), CDMA (code division multiple access), OFDMA, and SDMA (space division multiple access) schemes, as well as combinations of these multiple-access schemes.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Efficient exploitation of spatial diversity in a high-speed wireless network is a challenging task due to the broadband nature of spatial channel characteristics. In OFDMA networks, the wide spectrum is partitioned into parallel narrowband traffic channels (commonly referred to as "sub-channels"). The methodology described herein provides a means for allocating traffic channels through intelligent traffic channel assignment.

In the communication system described herein, channel allocation logic performs "channel-aware" traffic channel allocation. In one embodiment, the channel allocation logic provides bandwidth on demand and efficient use of spectral resources (e.g., OFDMA traffic channels) and spatial resources (e.g., the physical location of subscribers as it pertains to spatial beamforming) and performs traffic channel assignment based on broadband spatial channel characteristics of a requesting subscriber and on-going subscribers. Furthermore, channels are allocated to subscribers based on the best antenna resources for those subscribers. Thus, the channel allocation provides enhanced performance over a larger number of subscribers than might be typically obtained using conventional channel assignment approaches.

In responding to a link request from a new subscriber, or when the base-station has data to transmit to a standby subscriber, the logic first estimates the channel characteristics of transmissions received over all, or a selected portion of OFDMA traffic channels for each antenna resource. As used herein, an antenna resource may comprise a single antenna, or a sub-array of antennas (from an array of an antennas for a given base station) that are collectively used to transmit and/or receive signals from subscribers. For example, multiple antennas may be configured to function (effectively) as a single antenna resource with improved transmission characteristics (when compared with a single antenna) by using one or more signal diversity schemes (spatial, frequency, and/or time). In one embodiment, the channel characteristics, along with channel assignment for on-going subscribers are used to determine which antenna resource is optimum for each subscriber. The channel characteristic data may be stored in a register or other type of storage location (e.g., a database, file, or similar data structure). In one embodiment, traffic channels corresponding to antenna resources that have the best communication characteristics are assigned to the accessing subscriber to satisfy the service request of the accessing subscriber.

Figure 1:
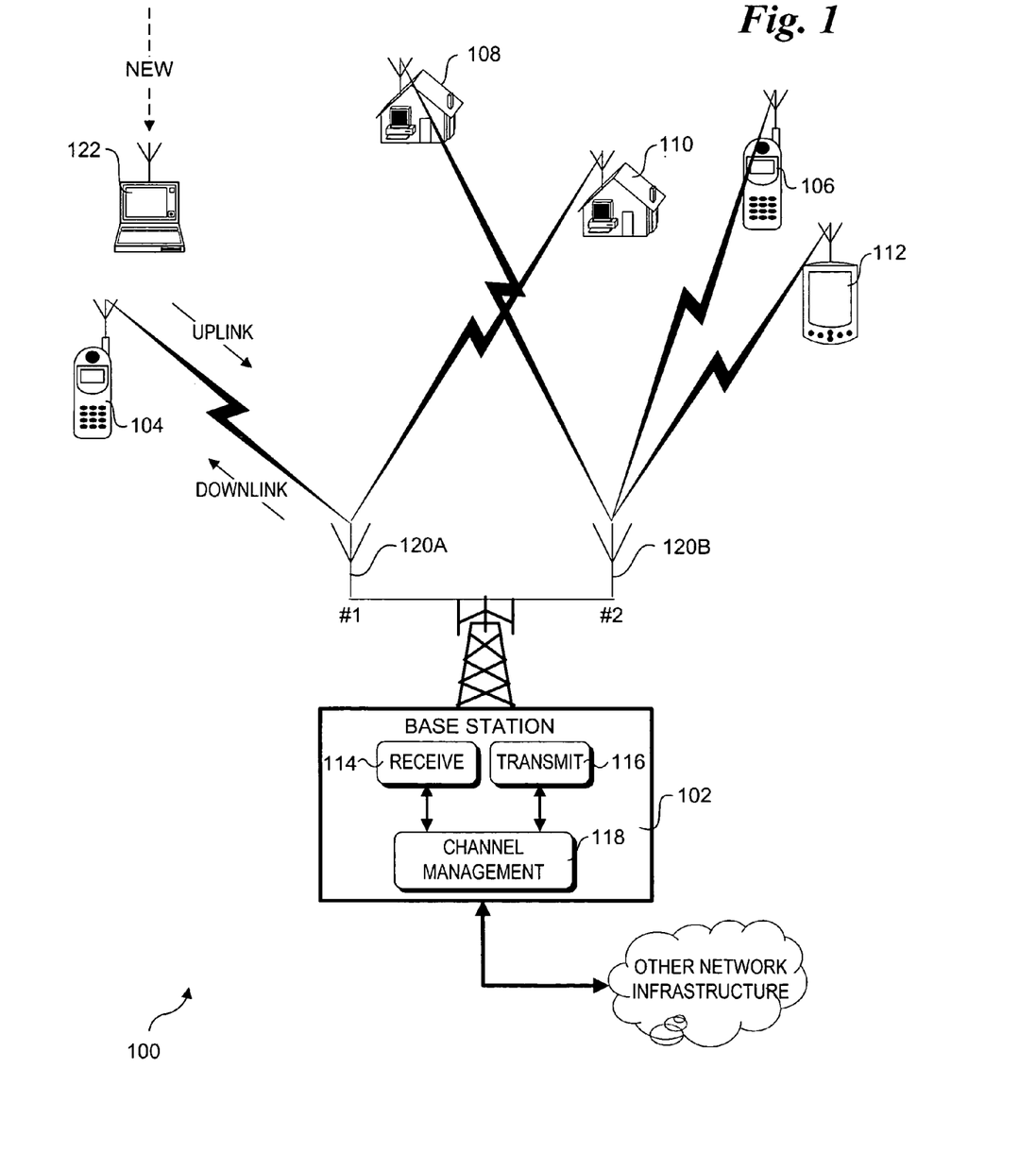
FIG. 1 shows a base station employing a pair of switched antennas that are used to communicate with various subscribers, wherein each subscriber is assigned to a channel corresponding to a respective subchannel/antenna combination.

An exemplary portion of a broadband wireless network 100 including a base station 102 that implements the channel selection techniques described herein is shown in FIG. 1. Base station 102 includes facilities to support communication with various subscribers, as depicted by a mobile (phone) subscribers 104 and 106, fixed (location) subscribers 108 and 110, and a mobile (PDA) subscriber 112. These facilities include a receive module 114, a transmit module 116, and channel management component 118, as well as antennas 120A (also referred to herein as antenna #1) and 120B (also referred to herein as antenna #2).

Generally, a base station communicates with a subscriber in the following manner. Data bursts, such as cellular packets, IP packets or Ethernet frames, are encapsulated into an appropriate data frame format (e.g., IEEE 802.16 for WiMAX networks) and forwarded from a network component, such as a radio access node (RAN), to an appropriate base station within a given cell. The base station then transmits to a selected subscriber (identified by the data frame) using a unidirectional wireless link, which is referred to as a "downlink." Transmission of data from a subscriber to network 100 proceeds in the reverse direction. In this case, the encapsulated data is transmitted from a subscriber to an appropriate base station using a unidirectional wireless link referred to as an "uplink." The data packets are then forwarded to an appropriate RAN, converted to IP Packets or Ethernet frames, and transmitted henceforth to a destination node in network 100. Under some types of broadband wireless networks, data bursts can be transmitted using either Frequency-Division-Duplexing (FDD) or Time-Division-Duplexing (TDD) schemes. In the TDD scheme, both the uplink and downlink share the same RF (radio frequency) channel, but do not transmit simultaneously, and in the FDD scheme, the uplink and downlink operate on different RF channels, but the channels may be transmitted simultaneously. In general, the uni-direction wireless downlinks may comprise a point-to-point (PP) link, a point-to-multiple (PMP), or a MIMO link. Uplinks typically comprise PP or PMP links, although MIMO links may also be used.

Multiple base stations are configured to form a cellular-like wireless network, wherein one or more base stations may be accessible to a given subscriber at any given location using a shared medium (space (air) through which the radio waves propagate). A network that utilizes a shared medium requires a mechanism to efficiently share it. Sharing of the air medium as enabled via an appropriate channel-based scheme, wherein respective channels are assigned to each subscriber within the access range of a given base station. Typical channel-based transmission schemes include FDMA, TDMA, CDMA, OFDMA, and SDMA, as well as combination of these multiple access schemes. Each of these transmission schemes are well-known in the wireless networking arts.

To facilitate downlink and uplink communications with the various subscribers, base station 102 provides multiple antennas. For illustrative purposes, these are depicted as antenna 120A and antenna 120B (antennas #1 and #2) in FIG. 1. Signals from two or more of the multiple antennas may be combined to support beam forming or spatial multiplexing, or may be used individually for different groups of subscribers using well-known techniques. The multiple antennas may also be configured in one or more clusters. In general, antennas 120A and 120B are representative of various antenna types employed in wireless broadband network, including sectorized antennas and omni-directional antennas.

Under one embodiment, each subscriber is assigned to a respective channel or subchannel provided by one of the antennas at a given base station (or antenna resources, when multiple antennas may be combined to transmit or receive signals). For example, in the illustrated configuration of FIG. 1, mobile subscriber 104 and fixed subscriber 110 are assigned to respective channels facilitated by antenna 120A, while fixed subscriber 108, and mobile subscribers 106 and 112 are assigned to respective channels facilitated by antenna 120B. As described in further detail below, the channel/antenna or subchannel/antenna selection for each subscriber is based on the best available channel characteristics at the point at which a new subscriber enters the network via a given base station (e.g., base station 102). In addition, channels may be re-assigned to on-going subscribers based on changes in measured channel characteristics.

By way of illustration, the following discussion concerns allocation of channels for an OFDMA network. However, this is not meant to be limiting, as similar principles may be applied to wireless networks employing other channel-based transmission schemes, including FDMA, TDMA, CDMA, SDMA, and OFDMA/SDMA, as well as other combinations of these schemes.

In accordance with aspects of the present invention, a channel allocation scheme is now disclosed that allocates downlink and/or uplink or shared (bi-directional) channels for respective subscribers to selected antenna resources based on current channel characteristics. The overall approach is to assign channel/antenna or subchannel/antenna combinations having the best channel characteristics to new and on-going subscribers.

Figure 2:
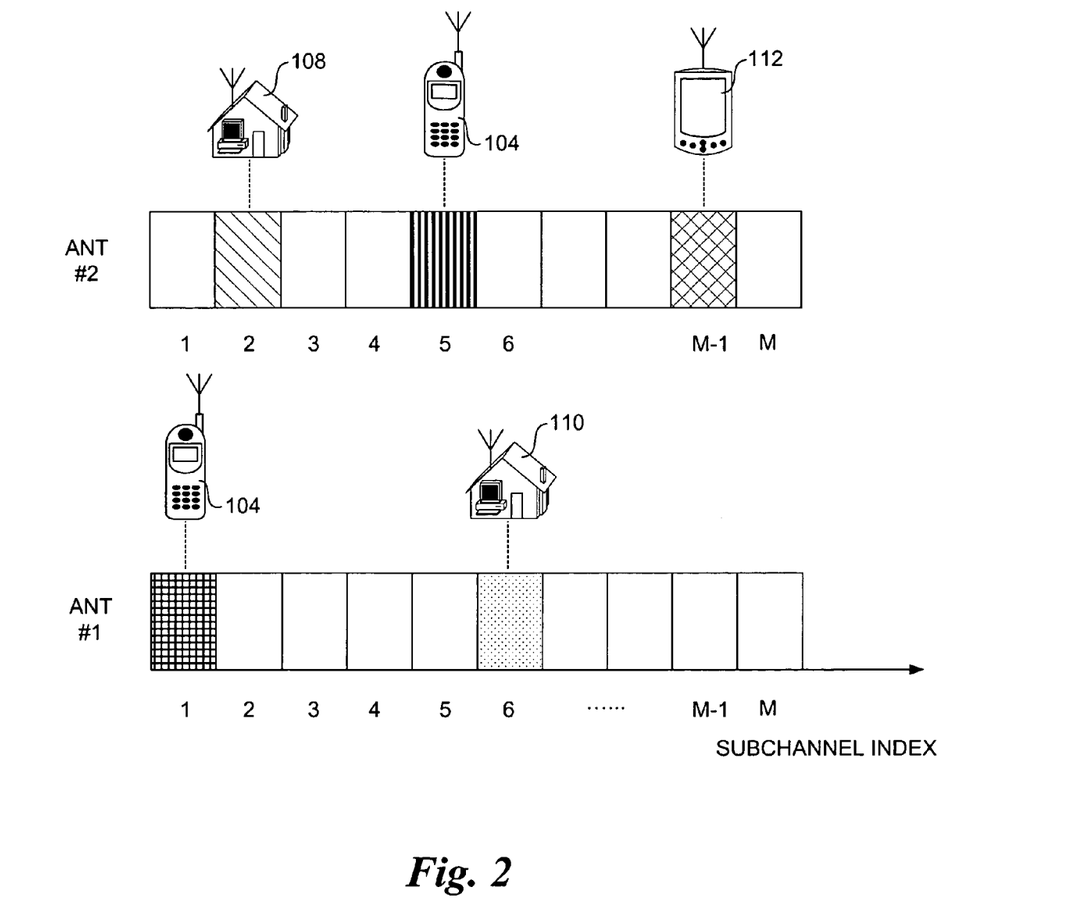
FIG. 2 shows an OFDMA subchannel allocation for the subscribers shown in FIG. 1 prior to the entry of a new subscriber.

FIG. 2 shows an exemplary set of initial OFDMA channel assignments for the various subscribers shown in FIG. 1. In the illustrated embodiment, each of antennas #1 and #2 (120A and 120B) supports N subchannels. Typically, a respective subchannel for a given antenna or antenna resource is assigned to each subscriber. In some cases, multiple subchannels may be assigned for the same subscriber. For illustrative purposes, only a single set of subchannel assignments in FIG. 2 are shown, wherein the single set is illustrative of uplink, downlink, or shared (same channel for uplink and downlink) channel assignments. It will be understood that another set of channel assignments will also exist for transmission schemes that employ separate channels for downlink and uplink traffic.

Figure 3A:
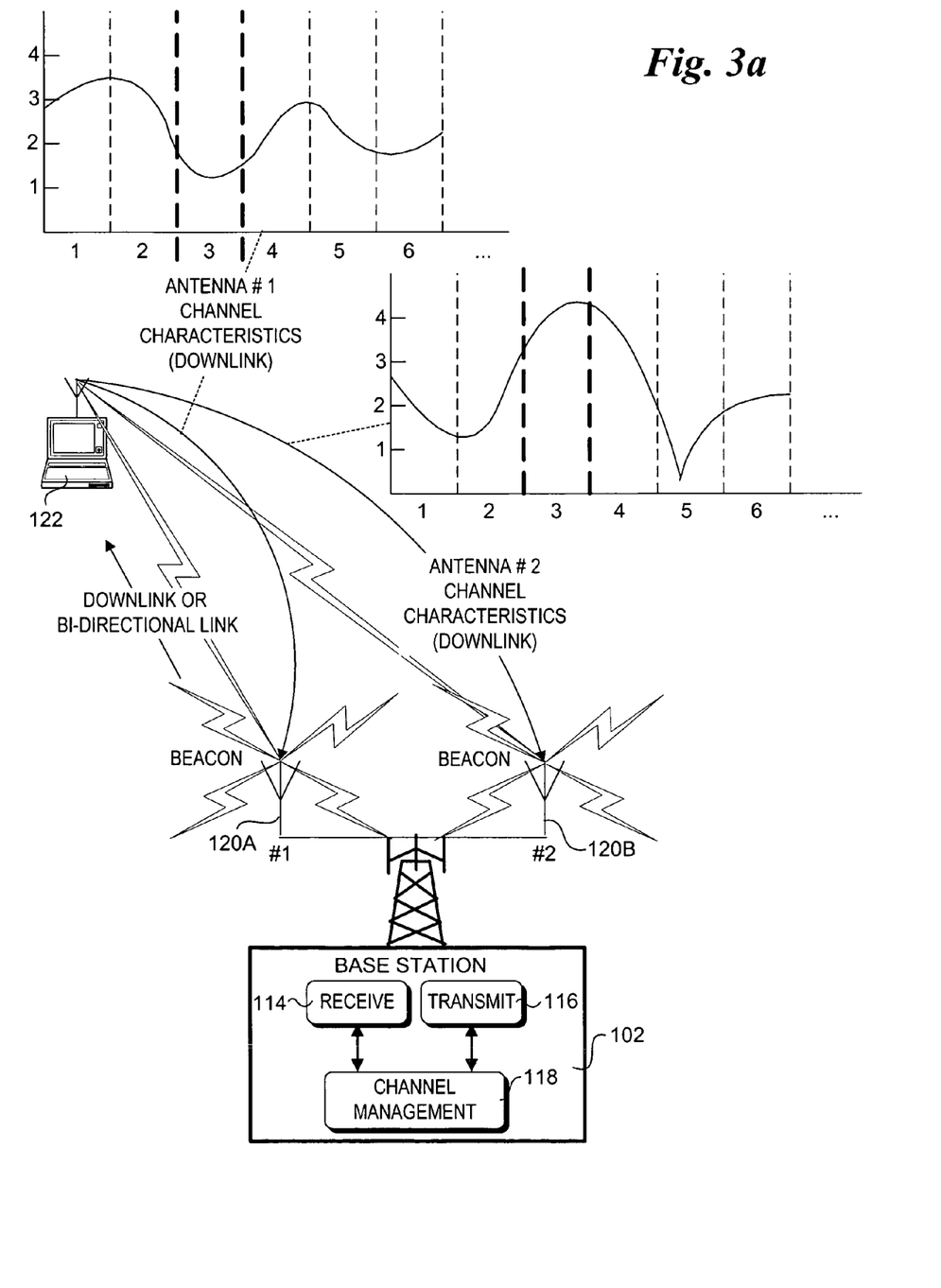
FIG. 3a shows a beacon signal sent out by each of the antennas in FIG. 1 that is received by a new subscriber and contains various channels via which the new subscriber can measure downlink or bi-directional link channel characteristics that are returned to the base station.

Referring to FIGS. 1 and 3a, now suppose that a new mobile subscriber 122 attempts to initiate service with base station 102, either by originating a new service request or in connection with a hand-over from another (currently) serving base station (not shown) to base station 102. As discussed above, it is desired to assign a best available channel to the new user. Accordingly, a mechanism for determining the best available channel is provided.

Figure 4A:
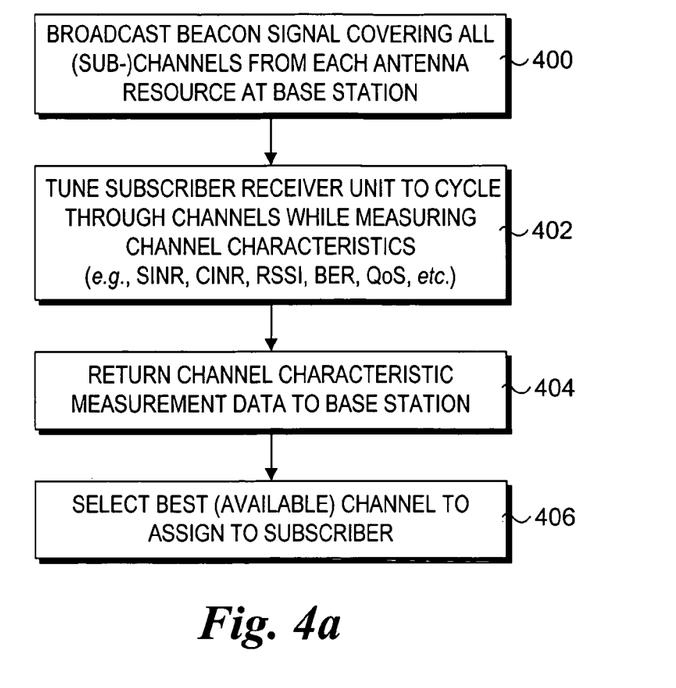

With further reference to the flowchart of FIG. 4a, one embodiment of a process for determining the channel characteristics begins at a block 400, wherein a base station broadcasts a beacon signal covering all sub-channels over the frequency bandwidth allocated to that station from each of its antenna resources. For example, under an FDMA scheme, the broadcast signal may comprise a signal that varies in frequency over the allocated bandwidth using a pre-determined cycle. Under a CDMA scheme, a test signal transmitted over various CDMA channels that are changed in a cyclic manner may be used. Under a channel scheme that supports multiple channels operating on the same frequencies (such as OFDMA), the broadcast signal will include applicable subchannel/frequency combination per antenna resource. (Further details of one embodiment of an OFDMA beacon signal scheme are described below.) As a result, the broadcast beacon signal will provide information from which spatial and frequency channel characteristics may be determined. In one embodiment, the beacon signal is broadcast over a management channel on an ongoing basis. In the case of some channel schemes based on time slots (e.g., OFDMA, CDMA, TDMA), it may be necessary to first perform timing synchronization between a base station and subscriber to enable the subscriber to adequately tune into (e.g., synchronize with) the broadcast beacon signal.

Figure 5:
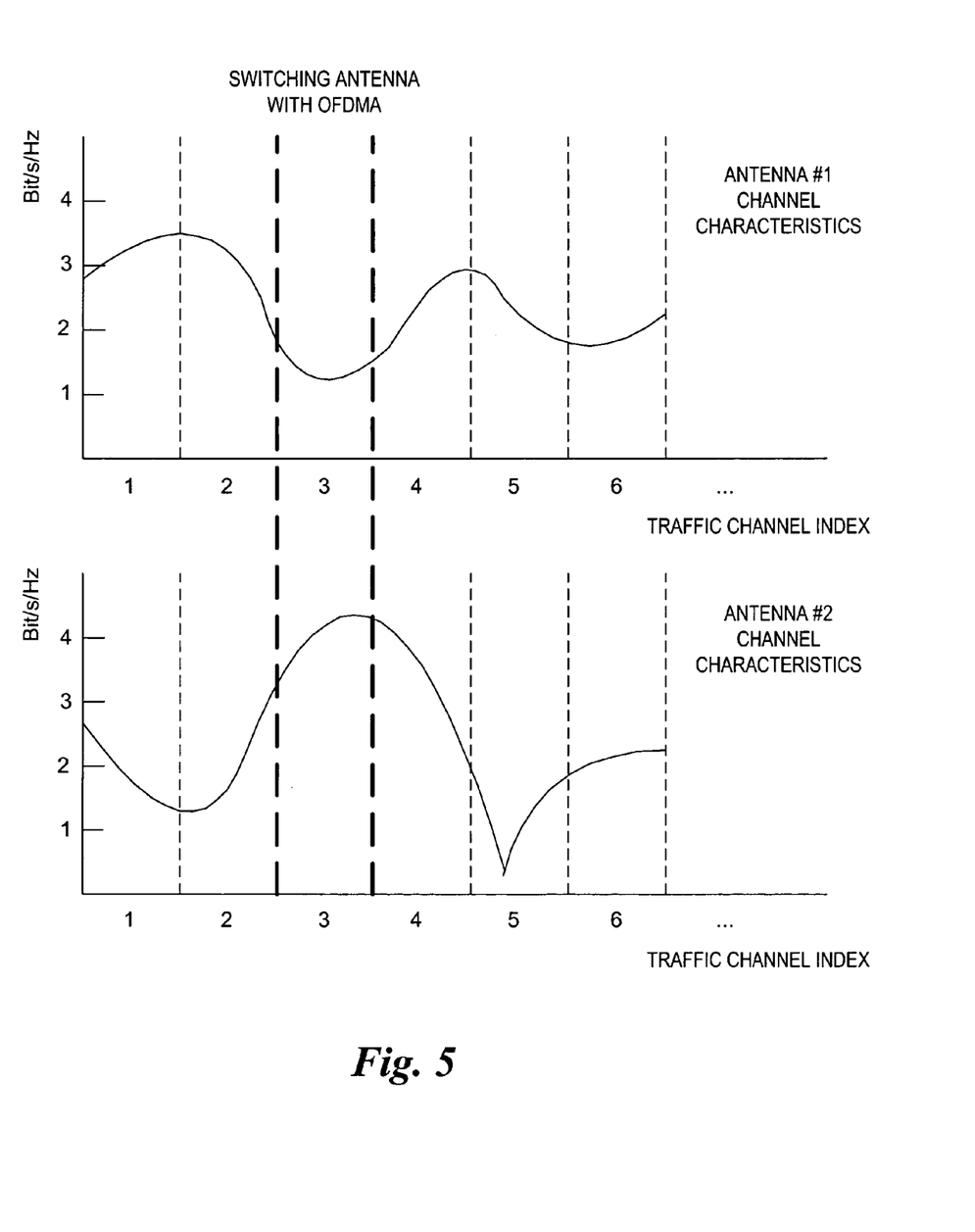
FIG. 5 depicts exemplary subscriber's channel responses corresponding to channel characteristics for the switched antennas of FIG. 1.

In response to the beacon signal, the subscriber (device) tunes its receiving unit to cycle through the various channels (in synchrony with the channel changes in the beacon signal) while measuring channel characteristics. For example, in one embodiment, signal-to-interference plus noise ratio (SINR, also commonly referred to as carrier-to-interference plus noise ratio (CINR) for some types of wireless networks) and/or relative-signal strength indicator (RSSI) measurements are performed at the subscriber to obtain the channel characteristic measurements or estimates. In one embodiment, the channel characteristic measurement pertains to data rates that can reliably be obtained for different channels, as exemplified by the sets of channel characteristic measurement data corresponding to antennas #1 and #2 shown in FIG. 5 (with reduced versions shown in FIG. 3a). For example, it is common to measure such data rates in Bits per second per Hertz (Bit/s/Hz), as shown in FIG. 5. In another embodiment, BER measurements are made for each channel/antenna resource combination. In yet another embodiment, Quality of Service (QoS) parameters, such as delay and jitter are measured to obtain the channel characteristic data. In still other embodiments, various indicia of signal quality/performance may be measured and/or estimated to obtain the channel characteristic data.

Continuing at a block 404 in FIG. 4a, after, or as channel characteristic measurements are taken, corresponding data is returned to the base station. In one embodiment, this information is returned via a management channel employed for such purposes. In response, a best available channel is selected to be assigned to the subscriber in view of current channel availability information and the channel characteristic data. Details of the selection process are described below with reference to FIG. 6.

Exemplary OFDMA Downlink/Bi-Directional Link Channel Characterization

Under one embodiment employed for OFDMA networks, each base station periodically broadcasts pilot OFDM symbols to every subscriber within its cell (or sector). The pilot symbols, often referred to as a sounding sequence or signal, are known to both the base station and the subscribers. In one embodiment, each pilot symbol covers the entire OFDM frequency bandwidth. The pilot symbols may be different for different cells (or sectors). The pilot symbols can serve multiple purposes: time and frequency synchronization, channel estimation and SINR measurement for subchannel allocation.

In one embodiment, each of multiple antenna resources transmits pilot symbols simultaneously, and each pilot symbol occupies the entire OFDM frequency bandwidth. In one embodiment, each of the pilot symbols have a length or duration of 128 microseconds with a guard time, the combination of which is approximately 152 microseconds. After each pilot period, there are a predetermined number of data periods followed by another set of pilot symbols. In one embodiment, there are four data periods used to transmit data after each pilot, and each of the data periods is 152 microseconds in length.

As the pilot OFDM symbols are broadcast, each subscriber continuously monitors the reception of the pilot symbols and measures (e.g., estimates) the SINR and/or other parameters, including inter-cell interference and intra-cell traffic, for each subchannel. In one embodiment, the subscriber first estimates the channel response, including the amplitude and phase, as if there is no interference or noise. Once the channel is estimated, the subscriber calculates the interference/noise from the received signal.

During data traffic periods, the subscribers can determine the level of interference again. The data traffic periods are used to estimate the intra-cell traffic as well as the subchannel interference level. Specifically, the power difference during the pilot and traffic periods may be used to sense the (intra-cell) traffic loading and inter-subchannel interference to select the desirable subchannel.

In one embodiment, each subscriber measures the SINR of each subchannel (or a set of subchannels corresponding to available subchannels) and reports these SINR measurements to their base station through an access channel. The feedback of information from each subscriber to the base station contains an SINR value (e.g., peak or average) for each subchannel. A channel indexing scheme may be employed to identify the feedback data for each subchannel; no indexing is needed if the order of information in the feedback is known to the base station in advance.

Upon receiving the feedback from a subscriber, the base station selects a subchannel to assign to the subscriber in a manner similar to that described below. After subchannel selection, the base station notifies the subscriber about the subchannel assignment through a downlink common control channel or through a dedicated downlink traffic channel if the connection to the subscriber has already been established. In one embodiment, the base station also informs the subscriber about the appropriate modulation/coding rates. Once the basic communication link is established, each subscriber can continue to send the feedback to the base station using a dedicated traffic channel (e.g., one or more predefined uplink access channels).

The foregoing scheme determines channel characteristics for downlink and shared bi-directional link channels. However, it may be inadequate for predicting uplink channel characteristics. The reason for this is that multipath fading is generally unidirectional. As a result, a channel that produces good downlink channel characteristics (as measured at a receiving subscriber) may not provide good uplink channel characteristics (as measured at a receiving base station).

Figure 3B:
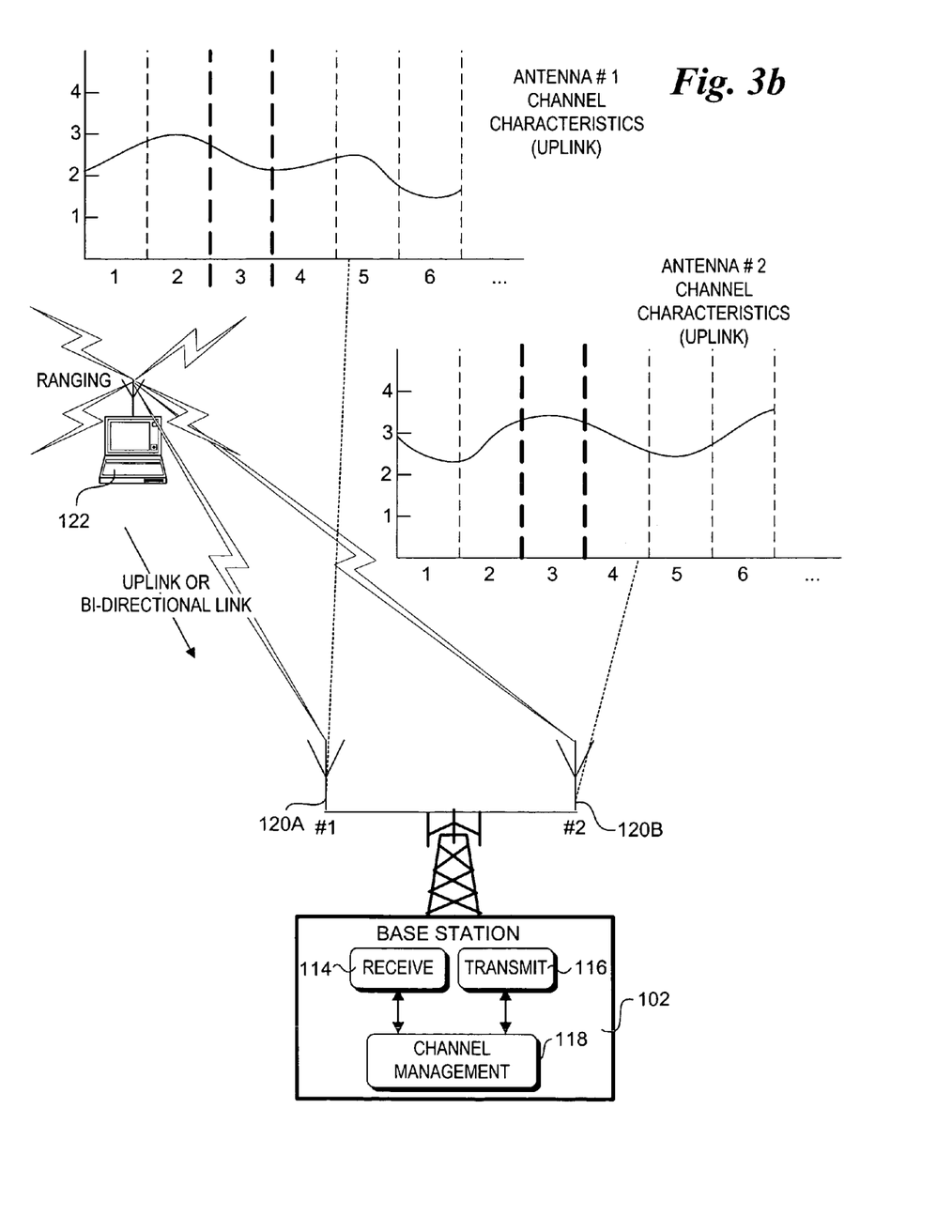
FIG. 3b shows a ranging signal sent out by the new subscriber and containing test data sent over various channels via which uplink or bi-directional channel characteristics can be measured at each of the switched antennas of FIG. 1.
Figure 4B:
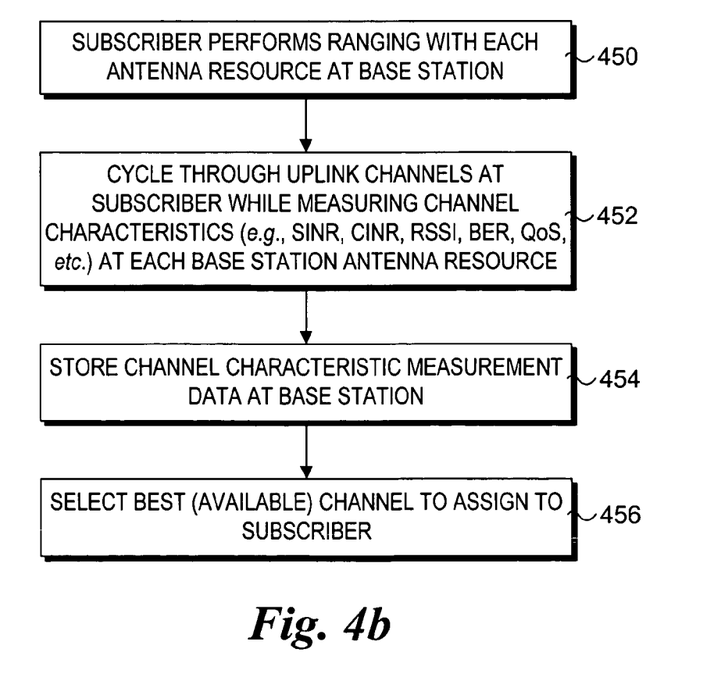
FIG. 4b is a flowchart illustrating operations performed to obtain uplink or bi-directional link channel characteristics using the ranging signal scheme of FIG. 3b.

With reference to FIGS. 3b and 4b, one embodiment of a process for determining channel characteristics for uplink channels (or optionally, bi-directional shared channels) begins at a block 450 (FIG. 4b), wherein a subscriber performs ranging with each antenna resource at the base station. The term "ranging" is used by the WiMAX (IEEE 802.16) standard to define a set of operations used by a subscriber station to obtain service availability and signal quality information from one or more base stations. During this process, a subscriber station synchronizes with a base station and a series of messages are exchanged between the subscriber station and the base station. Also, signal quality measurements may be obtained by performing CINR and/or RSSI measurements at the base station and/or the subscriber station.

As used herein, "ranging" generally concerns transmission activities initiated by a subscriber to enable uplink channel characteristics to be measured by a base station; thus, ranging includes the aforementioned ranging operations defined by the WiMAX specification for WiMAX networks, as well as other techniques used to obtain uplink channel characteristics. For example, similar operations to those employed during WiMAX ranging may be employed for other types of broadband wireless networks. In one embodiment, a subscriber and base station exchange information relating to a channel sequence over which channel characteristic measurements will be made. For example, in some implementations a base station may only identify unused uplink channels to measure, thus reducing the number of measurements that will be performed. Optionally, the channel sequence may be known in advance.

Continuing at a block 452, in view of the channel sequence information, the subscriber cycles through the applicable uplink channels while transmitting test data to each base station antenna resource. In general, this may be performed concurrently for all individual antennas or combined antenna resources, or may be performed separately for each antenna resource. In connection with the transmission of the test data via each uplink channel, channel characteristic measurements are made by the base station in block 452 and stored in block 454. In general, the channel characteristic measurements performed in block 452 are analogous to those performed in block 402 (FIG. 4a), except now the measurements are made at the base station rather than at the subscriber. The best available uplink channel to assign the subscriber is then selected in a block 456 in the manner now described with reference to the operations of FIG. 6.

Figure 6:
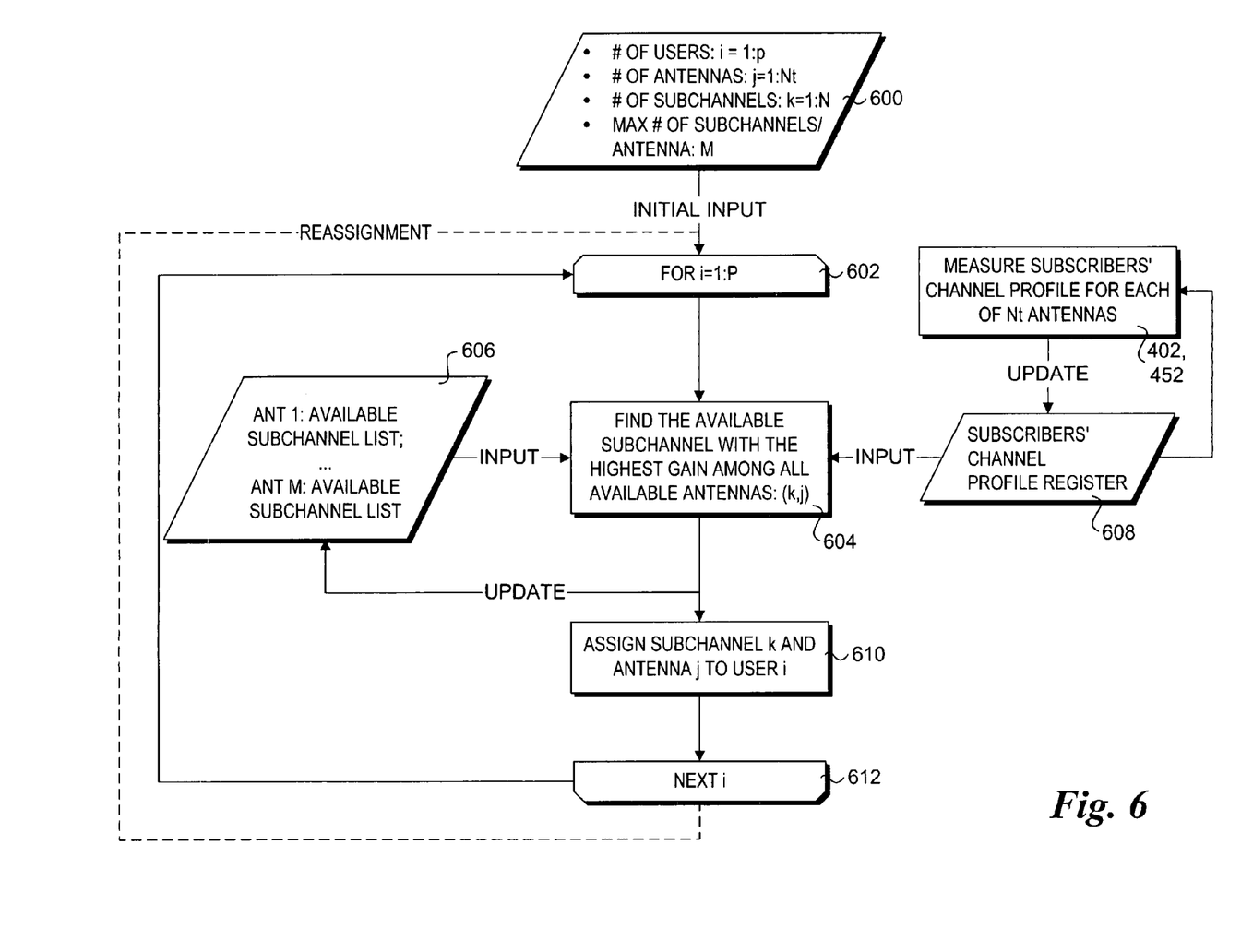
FIG. 6 shows a flowchart illustrating operations performed to assign channels to various users for a base station having multiple antenna resources, wherein a channel comprising the best available subchannel/antenna combination is assigned to a new user based on measured or estimated subchannel characteristics for each antenna.

In further detail, FIG. 6 depicts a process for channel assignment under a generic configuration for a base station having a variable number of users (subscribers), antennas (individual antennas or combined antenna resources), and subchannels for each antenna or combined antenna resource. Accordingly, a set of data 600 comprising an initial input defining the number of users, antennas, number of subchannels, and maximum number of subchannels per antenna is provided to the processing operations depicted below data 600 in FIG. 6.

As depicted by start and end loop blocks 602 and 612, the operations depicted in the blocks 604, 606, and 610 are performed for each of users 1 to P. First, in block 604, the available subchannel with the highest gain is selected among all available antennas (or combined antenna resources, if applicable). As depicted by input data block 606, the set of available subchannels for each of antennas is maintained and updated on an ongoing basis to provide current subchannel allocation information to block 604. In addition, channel characteristic profile data measured in blocks 402 and/or 452 (as applicable) is stored in a subscribers' channel profile register 608 and updated on an ongoing basis. During channel selection for a particular subscriber, corresponding channel characteristic profile data is retrieved from subscribers' channel profile register 608 as an input to block 604.

In view of input data from data blocks 606 and 608, a subchannel k and antenna j are assigned to the user i in block 610. The process then moves to the next user (e.g., user i+1) to assign a channel comprising a subchannel/antenna combination for that user via the operations of block 604 in view of updated input data from data blocks 606 and 608. In general, these operations are repeated on an ongoing basis.

These concepts may be more clearly understood from exemplary channel assignment parameters in accordance with network participants shown in the figures herein. For example, FIG. 2 illustrates an initial condition wherein mobile subscriber 106 and fixed subscriber 110 are respectively assigned channels comprising subchannels 1 and 6 for antenna #1, while fixed subscriber 108 is assigned a channel comprising subchannel 2 for antenna #2 and mobile subscribers 104 and 112 are respectively assigned channels comprising subchannels 5 and M-1 for antenna #2. For point of illustration, these channel assignments are representative of uplink, downlink, or bi-directional link channel assignments. For the following example it is presumed that corresponding channel assignment information is present in data block 606.

Now suppose that mobile subscriber 122 (FIGS. 1, 3a, and 3b) attempts to enter the network. First, channel characteristic measurement data will be collected in accordance with the operations of the flowcharts shown in FIGS. 4a and/or 4b, as applicable. This will update subscribers' channel profile register 608. During the processing of block 604, antenna channel characteristic data for each of antennas #1 and #2 will be retrieved from subscribers' channel profile register 608. As discussed above, exemplary channel characteristic data are depicted in FIG. 5. In view of this channel characteristic data in combination with available subchannel information shown in FIG. 2 and retrieved from data block 606, a new channel for mobile subscriber 122 is selected in block 610.

In the view of the exemplary channel characteristic data and subchannel assignment data in respective FIGS. 5 and 2, subchannel 3 for antenna #2 should be assigned to mobile subscriber 122, which represents the available channel with the highest gain (e.g., available channel with the best channel characteristics). In one embodiment, this may be determined in the following manner. First, the channel with the highest gain is selected for each antenna resource. In the present example, this corresponds to channel 1 for antenna #1 and subchannel 3 for antenna #2. Next, a determination is made to whether that subchannel is available. In the case of subchannel 1 for antenna #1, this subchannel is already assigned, so it is not available. The channel corresponding to the next best gain is then selected for antenna #1, which corresponds to subchannel 5. Likewise, a similar determination is made for channel 2. In the present example, subchannel 3, which represents the subchannel for antenna #2 with the highest gain, is available. The gains for subchannel 5 for antenna #1 and subchannel 3 for antenna #2 are then compared. The subchannel/antenna combination with the highest gain is then selected for assignment to the new subscriber. This results in the selection of subchannel 3 for antenna #2 as the new channel to be assigned to mobile subscriber 122.

From time to time, processing logic may perform channel reassignment by repeating the process described above with reference to FIG. 6. This channel reassignment compensates for subscriber movement and any changes in interference. In one embodiment, each subscriber reports its channel characteristics data. The base station then performs selective reassignment of subchannel and antenna resources. That is, in one embodiment some of the subscribers may be reassigned to new channels, while other channel assignments will remain as before. In one embodiment, retraining is initiated by the base station, and in which case, the base station requests a specific subscriber or subscribers to report its updated channel characteristics data. A channel reassignment request may also be submitted by a subscriber when it observes channel deterioration.

Figure 7:
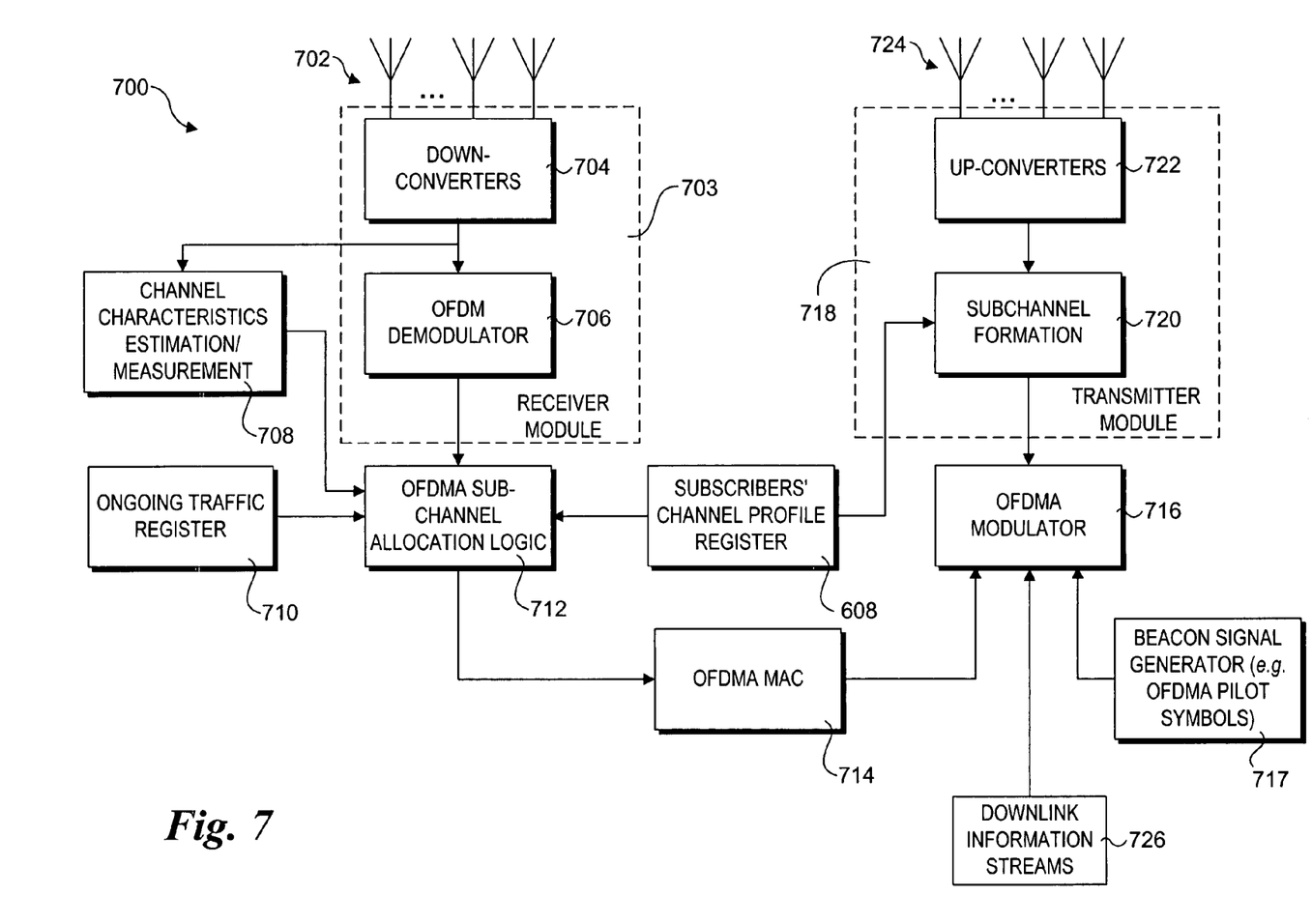
FIG. 7 is a block diagram of one embodiment of an OFDMA/SDMA base-station.

FIG. 7 is a block diagram of base station 700 that communicates with multiple subscribers through OFDMA and spatial multiplexing. The base-station 700 comprises receiving antenna array 702, a receiver module 703 including a set of down-converters 704 coupled to receiving antenna array 700 and an OFDM demodulator 706, a channel characteristics module 708, an on-going traffic register 710, OFDMA subchannel channel allocation logic 712, a subscribers's channel profile register 608, an OFDMA medium access controller (MAC) 714, an OFDM modem 716, a beacon signal generator, an OFDMA transmitter module 718 including a subchannel formation block 720, and a set of up-converters 722 that provide inputs to respective antenna resources in a transmission antenna array 724.

Uplink signals, including the accessing signal from a requesting subscriber, are received by receiving antenna array 702 and down-converted to the base-band by down-converters 704. The base-band signal is demodulated by OFDM demodulator 706 and also processed by channel characteristics block 708 for estimation of the accessing subscriber's uplink channel characteristics using one of the techniques described above or other well-known signal quality estimation algorithms. The estimated or measured channel characteristics data, along with channel characteristics corresponding to channels assigned to ongoing traffic that is stored in subscribers channel profile register 608 and on-going traffic information stored in the on-going traffic register 710, are fed to OFDMA subchannel allocation logic 712 to determine a channel assignment for the accessing subscriber, and possibly partial or all of the on-going subscribers. The results are sent to OFDMA MAC 714, which controls the overall traffic.

Control signals from OFDMA MAC 714 and downlink data streams 726 are mixed and modulated by OFDM modulator 716 for downlink transmission. Subchannel formation (such as the antenna beamforming/switching operations described below with reference to FIG. 8) is performed by subchannel formation block 720 using subchannel definition information stored in the subscribers' channel profile register 608. The output of subchannel formation block 720 is up-converted by the set of up-converters 722, and transmitted through transmission antenna array 724.

Beacon signal generator 717 is used to generate a beacon signal appropriate to the underlying transmission scheme. For example, for an OFDMA transmission scheme, beacon signal generator 717 generates a signal including OFDMA pilot symbols interspersed among test data frames.

Figure 8:
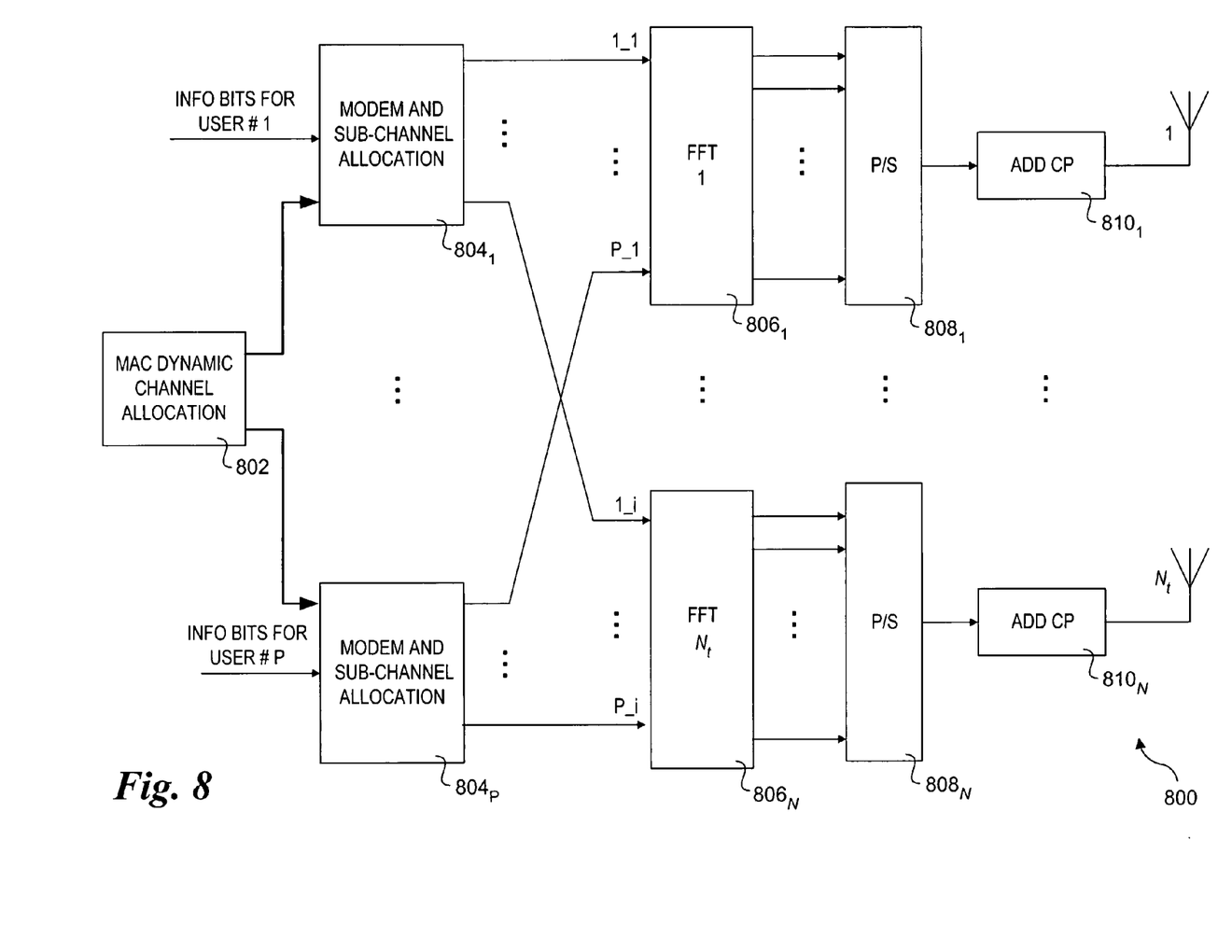
FIG. 8 shows an architecture for a OFDMA transmitter module employing multiple switched antennas.

Details of functional blocks corresponding to one embodiment of an OFDMA transmitter module 800 for a base station having N antennas are shown in FIG. 8. A MAC dynamic channel allocation block 802 is used to select an appropriate antenna resource and subchannel for each of P users, as depicted by selection inputs to modem and subchannel allocation blocks $804_{1-P}$. Based on the modem and subchannel allocation for each user, a corresponding OFDMA baseband signal is generated, up-converted, and transmitted over an appropriate antenna using signal-processing techniques that are well-known in the OFDMA transmission arts. The process is depicted by Fast Fourier Transform (FFT) blocks $804_{1-N}$, parallel to serial (P/S) conversion blocks $806_{1-N}$, and add cyclic prefix (CP) blocks $804_{1-N}$.

OFDMA transmitter module 800 performs antenna switching operations by adjusting the FFT inputs. For example, for a given subscriber channel, certain FFT inputs are set to 1 (meaning use), while other FFT inputs are set to 0 (meaning ignore). OFDMA transmitter module 800 also support channels that are facilitated by concurrently sending signals over multiple antennas.

In general, the operations performed by the process and functional blocks illustrated in the figures herein and described above are performed by processing logic that may comprise hardware (circuitry, dedicated logic, etc.), software (such as is run on a general purpose computer system or a dedicated machine), or a combination of both.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. method for assigning channels to support communication between subscribers and a base station in a broadband wireless network, comprising:

for each of multiple antenna resources configured for communication on multiple channels, at the base station, obtaining one or more channel characteristics for each channel hosted by each antenna resource, the channel characteristics indicative of reception quality for a corresponding channel; and assigning, by said base station, one or more channels to subscribers based on the one or more channel characteristics that are obtained;

wherein said obtaining one or more channel characteristics is accomplished, at least in part, by ranging operations performed by said subscribers;

wherein the channel characteristics are measured by performing operations comprising:

performing ranging operations between a subscriber and a base station over one of an uplink or bi-directional link, the ranging operations including transmissions sent from the subscriber station and received by each antenna resource, the transmissions carried over multiple channels; and obtaining, at each antenna resource, channel characteristics indicative of signal quality of each of the multiple channels.

2. The method of claim 1, wherein the one or more channels assigned comprise one or more downlink channels for use with transmissions sent from the base station to the subscribers.

3. The method of claim 1, wherein the one or more channel assigned comprise one or more uplink channels for use with transmissions sent from subscribers to the base station.

4. The method of claim 1, wherein the one or more channel assigned comprise one or more bi-directional link channels employed for both uplink and downlink transmissions between the base station and the subscribers.

5. The method of claim 1, wherein the channel characteristics are measured by performing operations comprising:

broadcasting a respective beacon signal from each of the antenna resources at the base station, each beacon signal including transmissions over multiple channels;

measuring channel characteristics indicative of signal quality for each of the multiple channels at a subscriber; and sending data corresponding to the channel characteristics that are measured from the subscriber to the base station.

6. The method of claim 5, wherein the respective beacon signals that are broadcast from each of the antenna resources comprise orthogonal frequency division multiple access (OFDMA) signals including OFDMA pilot symbols.

7. The method of claim 6, further comprising the subscriber using information from pilot symbol periods and data periods to measure channel and interference information.

8. The method of claim 6, wherein the pilot symbols occupy an entire OFDM frequency bandwidth.

9. The method of claim 1, wherein the multiple antenna resources comprises multiple individual antennas.

10. The method of claim 1, wherein at least one antenna resource comprises a set of antennas that are operated collectively to perform at least one of transmit and receive radio frequency transmissions.

11. The method of claim 1, wherein the wireless broadband network supports OFDMA (orthogonal frequency division multiple access) transmissions, and the channels comprise combinations of OFDMA subchannels and antenna resources.

12. The method of claim 11, further comprising switching antennas by adjusting the inputs to fast Fourier transform (FFT) blocks in an OFDMA transmitter module at the baseband.

13. The method of claim 11, wherein each subscriber is assigned to a single OFDMA channel, transmission for the single channel provided by a single antenna resource.

14. The method of claim 1, wherein the channel assignment operations are employed to assign respective channels for downlink and uplink transmissions.

15. The method of claim 1, wherein the channel characteristic measurements comprise at least one of Signal-to-interference plus noise ratio (SINR), carrier-to-interference plus noise ratio (CINR) and relative-signal strength indicator (RSSI) measurements.

16. The method of claim 1, wherein the channel characteristic measurements comprise bit error rate (BER) measurements.

17. The method of claim 1, wherein the channel characteristic measurements comprise measurement of Quality of Service (QoS) parameters.

18. The method of claim 1, wherein the channels comprise one of channels or subchannels corresponding to at least one of a FDMA (frequency division multiple access), TDMA (time division multiple access), CDMA (code division multiple access), OFDMA (orthogonal frequency division multiple access), and SDMA (space division multiple access) channel schemes.

19. The method of claim 1, further comprising:

periodically updating channel characteristics information for one or more subscribers; and reassigning channels for at least one subscriber in view of changed channel characteristics.

20. A base station, comprising:

multiple antenna resources to support wireless communications system transmissions;

a transmission module to generate signals over various downlink or bi-directional channels via which data is transmitted via the multiple antenna resources to multiple subscribers;

a reception module to extract data indicative of reception quality for a corresponding channel from signals received at the multiple antenna resources over various uplink or the bi-directional channels from the subscribers; and channel allocation logic to assign at least one of uplink, downlink and the bi-directional channels for the multiple subscribers based at least on channel characteristics indicative of reception quality obtained for the uplink, downlink and/or bi-directional channels;

wherein said assigning comprises:

maintaining and updating the set of available subchannels for each of available antennas on an ongoing basis, and selecting the available subchannel with the highest gain among available antennas.

21. The base station of claim 20, wherein the channel allocation logic assigns one of an uplink channel or bi-directional channel to a subscriber based on channel characteristics measured or estimated at the subscribers in response to beacon signals broadcast from each of the antenna resources, the base station further comprising:

a beacon signal generator.

22. The base station of claim 21, wherein the beacon signal generator generates orthogonal frequency division multiple access (OFDMA) signals including OFDMA pilot symbols.

23. The base station of claim 22, wherein the pilot symbols occupy an entire OFDM frequency bandwidth.

24. The base station of claim 20, wherein the multiple antenna resources comprise multiple individual antennas.

25. The base station of claim 20, wherein at least one antenna resource comprises a set of antennas that are operated collectively to transmit and/or receive radio frequency transmissions.

26. The base station of claim 20, further comprising:
means for measuring and/or estimating channel characteristics in response to ranging signals sent from the subscribers.

27. The base station of claim 20, further comprising:
a subscribers' channel profile register to store channel characteristics information for the subscribers; and
an ongoing traffic register to store channel assignment information.

28. A wireless communications system, comprising:
a plurality of subscriber units, each configured to support wireless communication; and
a base station including, multiple antenna resources, including transmit antenna resources to transmit wireless communication transmission signals and receive antenna resource to receive wireless communication transmission signals;
a transmission module, to generate signals over various downlink or bi-directional channels via which data is transmitted via the transmit antenna resources to the plurality of subscribers;
a reception module, to extract data from signals received at the receive antenna resources over various uplink or the bi-directional channels from the plurality of subscribers; and
channel allocation logic to assign at least one of uplink, downlink and the bi-directional channels for the plurality of subscribers based on channel characteristics measured and/or estimated for the uplink, downlink and/or bi-directional channels, each of the plurality of subscribers to measure or estimate channel characteristic information indicative of channel signal quality at the subscriber and provide feedback to the base station containing the channel characteristic information;
wherein said assigning comprises:
maintaining and updating the set of available subchannels for each of available antennas on an ongoing basis, and
selecting the available subchannel with the highest gain among available antennas.

29. The system of claim 28, wherein the base station channel allocation logic assigns one of an uplink channel or bi-directional channel to a subscriber based on channel characteristics measured or estimated at the subscribers in response to beacon signals broadcast from each of the transmit antenna resources, the apparatus further comprising:
a beacon signal generator.

30. The system of claim 29, wherein the beacon signal generator generates orthogonal frequency division multiple access (OFDMA) signals including OFDMA pilot symbols occupy an entire OFDM frequency bandwidth.

31. The system of claim 28, wherein at least one of the subscribers to generate ranging signals to be received at respective receive antenna resources for the base station, and wherein the base station further includes means for measuring channel characteristics indicative of signal quality of ranging signals received at the respective receive antenna resources, the channel allocation logic to assign one of an uplink or bi-directional channel for each of said at least one subscriber based on the channel characteristics that are measured and channel availability.

* * * * *